United States Patent
Shriner et al.

(10) Patent No.: US 7,380,431 B2
(45) Date of Patent: Jun. 3, 2008

(54) OIL FILM BEARING WITH COMPACT HYDRAULIC MOUNT

(75) Inventors: Dennis H. Shriner, Blaine, WA (US); Eric L. Johanson, Worcester, MA (US); Peter N. Osgood, Westboro, MA (US); Thomas C. Wojtkowski, Jr., Shrewsbury, MA (US)

(73) Assignee: Morgan Construction Company, Worcester, MA (US)

( * ) Notice: Subject to any disclaimer, the term of this patent is extended or adjusted under 35 U.S.C. 154(b) by 150 days.

(21) Appl. No.: 11/452,581

(22) Filed: Jun. 14, 2006

(65) Prior Publication Data

US 2007/0012081 A1 Jan. 18, 2007

Related U.S. Application Data

(60) Provisional application No. 60/700,290, filed on Jul. 18, 2005.

(51) Int. Cl.
*B21B 31/07* (2006.01)
(52) U.S. Cl. .......................................... 72/245; 72/237
(58) Field of Classification Search ................... 72/237, 72/249, 245, 247, 252.5, 236; 384/556
See application file for complete search history.

(56) References Cited

U.S. PATENT DOCUMENTS 3,822,081 A * 7/1974 Mercer et al. .............. 384/617

2007/0089470 A1 * 4/2007 Kneppe et al. ............... 72/247

FOREIGN PATENT DOCUMENTS

| DE | 2035698 | 1/1972 |
| EP | 1072333 | 1/2001 |
| WO | WO03022471 | 3/2003 |

* cited by examiner

*Primary Examiner*—Derris H. Banks
*Assistant Examiner*—Debra M Wolfe
(74) *Attorney, Agent, or Firm*—Gauthier & Connors LLP

(57) ABSTRACT

An oil film bearing is disclosed for a rolling mill roll having a tapered neck leading to a reduced diameter end section. The bearing comprises an internally tapered sleeve received in a seated position on the tapered roll neck. The sleeve is journaled for rotation in a bushing fixed within a chock assembly. A tubular piston is received on and fixed relative to the reduced diameter end section of the roll. A cylinder is internally subdivided by the piston into first and second chambers. A sleeve ring abuts an end of the sleeve and a circular thrust component is interposed between and arranged to overlap adjacent segments of the sleeve ring and the piston. One or the other of the first and second chambers may be pressurized, whereupon pressurization of the first chamber will cause the cylinder to axially advance and act via the thrust component and the sleeve ring to urge the sleeve into its seated position, and pressurization of the second chamber will cause the cylinder to axially retract and act via the chock assembly and the bushing to withdraw the sleeve from its seated position.

6 Claims, 2 Drawing Sheets

OIL FILM BEARING WITH COMPACT HYDRAULIC MOUNT

CROSS REFERENCE TO RELATED APPLICATION

This application claims priority from provisional patent application Ser. No. 60/700,290 filed Jul. 18, 2005.

BACKGROUND OF THE INVENTION

1. Field of the Invention

This invention relates to rolling mill oil film bearings for rolls having externally tapered necks, and is concerned in particular with an oil film bearing with an integral axially compact hydraulic mounting and locking assembly.

2. Description of the Prior Art

Bearings for tapered neck back-up rolls in flat rolling mills require an assembly that mounts and locks the bearings onto the roll necks. It is well known that hydraulic units built into the bearings are the most user-friendly type of mount and lock. The drawback is that traditional hydraulic mounts significantly increase the axial length of the bearing/roll assembly. This added length is a disadvantage in that it adds length to the bearing/roll assemblies, thus requiring heavier rolls, longer roll grinders, and wider mill foundations.

A need exists, therefore, for a more compact hydraulic mount that will make it possible to shorten the bearing/roll assembly, thereby reducing the system cost of the entire mill.

SUMMARY OF THE INVENTION

In accordance with the present invention, an oil film bearing includes an internally tapered sleeve received in a seated position on the tapered neck of a roll. The sleeve is journaled for rotation in a bushing fixed within an outer chock axially extended by a chock end plate and an outer end plate. The chock, chock end plate, and outer end plate are hereinafter collectively referred to as a "chock assembly." A tubular piston is received on and fixed relative to the end section of the roll. A cylinder is internally subdivided by the piston into first and second chambers, and a sleeve ring is arranged to abut the end of the sleeve. A circular thrust component is interposed between and arranged to overlap adjacent ends of the sleeve ring and the piston.

Pressurization of the first chamber will cause the cylinder to axially advance and act via the thrust component and the sleeve ring to urge the sleeve into its seated position. Pressurization of the second chamber will cause the cylinder to axially retract and act via the chock assembly and bushing to withdraw the sleeve from its seated position.

Preferably, the circular thrust component is a roller thrust bearing having an inner race captured between the sleeve ring and the cylinder, and outer races captured between confronting elements of the axial extension of the chock.

Alternatively, the circular thrust component may comprise a cylindrical ring, which preferably will have projecting radial flanges that span a gap between the cylindrical ring and an interior cylindrical surface of the axial chock extension.

These and other features and attendant advantages of the present invention will now be described in further detail with reference to the accompanying drawings wherein:

DESCRIPTION OF ILLUSTRATED EMBODIMENTS

Figure 1:
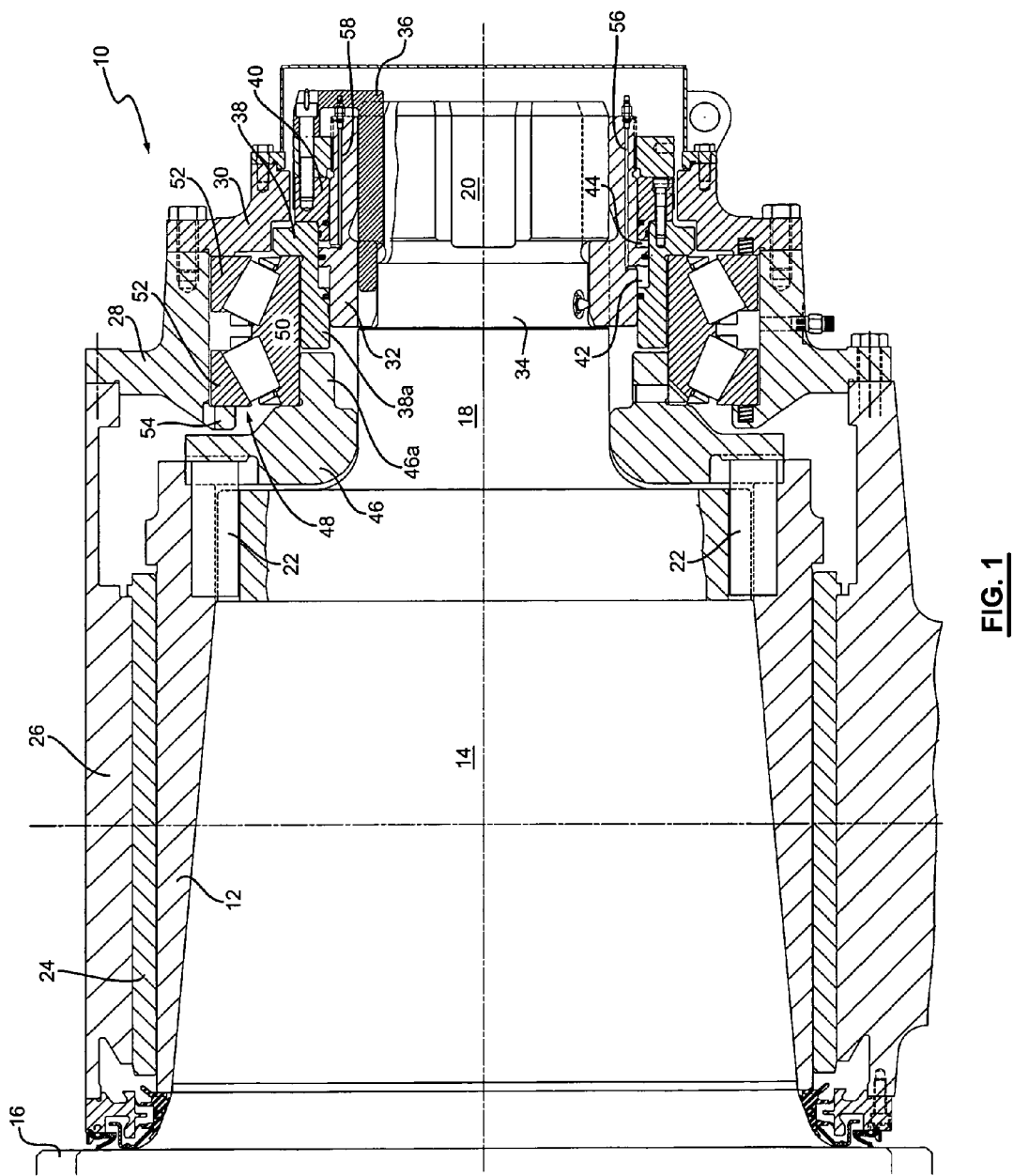
FIG. 1 is a sectional view through a thrust side oil film bearing in accordance with the present invention.

With reference initially to FIG. 1, an oil film bearing in accordance with one embodiment of the present invention is generally depicted at 10. The bearing has an internally tapered sleeve 12 axially received in a seated position on the externally tapered neck 14 of a rolling mill roll 16. The tapered roll neck leads to stepped reduced diameter end sections 18 and 20, with the sleeve being rotatably fixed to the roll neck by keys 22.

The sleeve is rotatably journaled in a bushing 24 fixed within an outer chock 26 axially extended by a chock end plate 28 and an outer end plate 30.

A tubular piston 32 is received on and fixed relative to the reduced diameter end section 20 of the roll. The piston is inserted via a bayonet connection into an axially interlocked relationship in a groove 34, and is rotatably fixed by a key 36.

A cylinder 38 has a closed inboard end and an open outboard end closed by an end cap 40. The cylinder surrounds and is internally subdivided by the piston 32 into first and second chambers 42, 44. A sleeve ring 46 abuts the sleeve 12. The sleeve ring 46 and the cylinder 38 are respectively provided with axially aligned cylindrical noses 46a, 38a overlapped by a circular thrust component indicated generally at 48.

In the embodiment of FIG. 1, the circular thrust component 48 comprises a roller thrust bearing having an inner race 50 captured between confronting shoulders on the sleeve ring 46 and the cylinder 38, and outer races 52 captured between a flange 54 on chock end plate 28 and the outer end plate 30.

Passageways 56, 58 provide a means for alternatively pressurizing one or the other of the cylinder chambers 42, 44. When a pressurized fluid, e.g. oil, is introduced into the first chamber 42, the cylinder 38 is axially advanced relative to the fixed piston 32 and acts via the thrust component 48 and the sleeve ring 46 to urge the sleeve 12 into its seated position. Alternatively, pressurization of the second chamber 44 will cause the cylinder to axially retract relative to the fixed piston and to act via the chock assembly, which includes the chock 26, end plate 28 and outer end plate 30, and the bushing 24 to withdraw the sleeve from its seated position.

Figure 2:
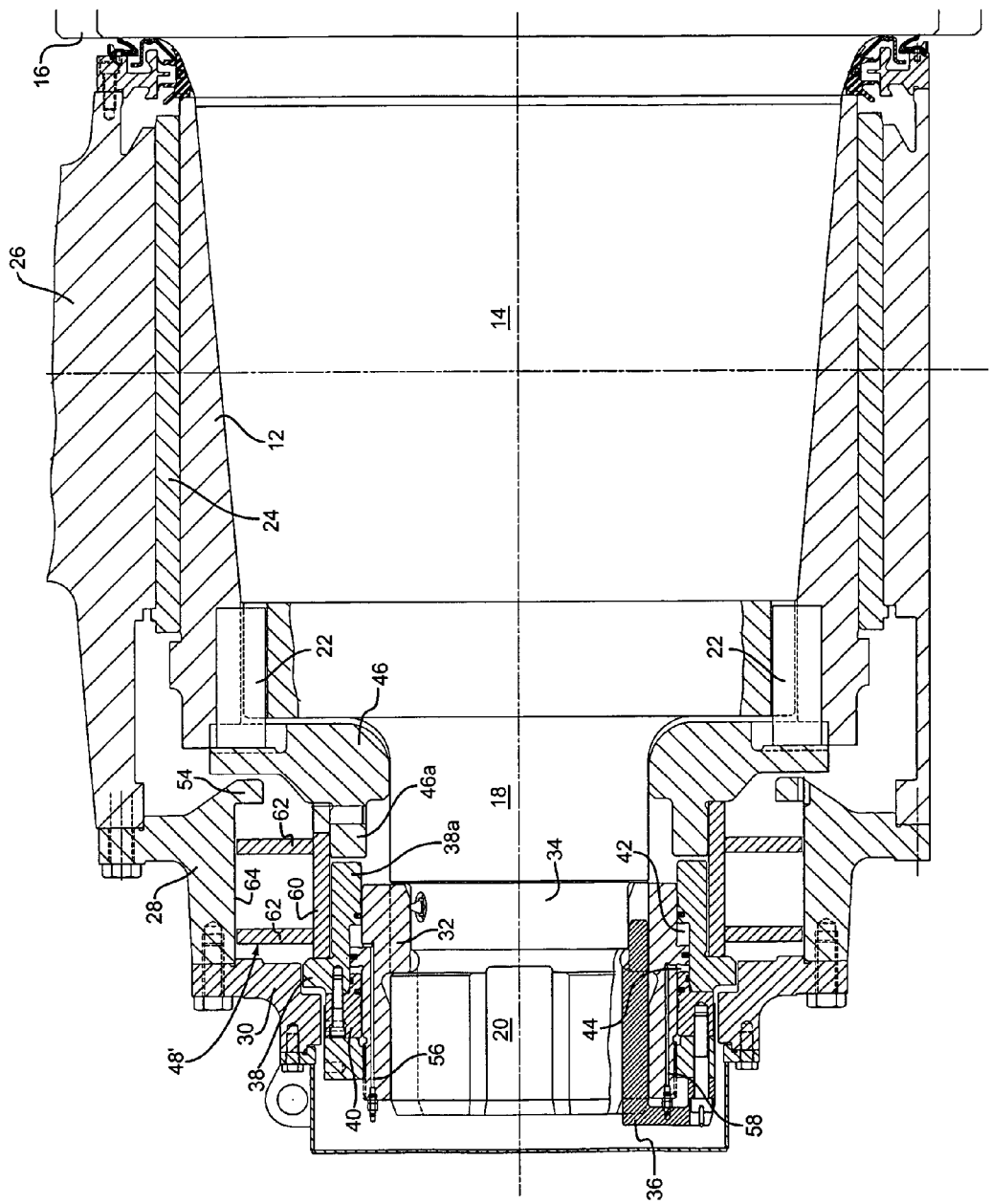
FIG. 2 is a sectional view of a non-thrust side bearing in accordance with the present invention.

With reference to FIG. 2, where like reference numerals designate the same components, a non-thrust side bearing is shown, where the thrust component 48' comprises a cylindrical ring 60 captured between the sleeve ring 46 and the cylinder 38. The ring overlaps the cylindrical noses 46a, 38a of the sleeve ring and cylinder. Preferably, the ring 60 has radial flanges 62 spanning the gap between the ring and an interior cylindrical surface 64 of the chock end plate 28.

It will thus be seen that by arranging the thrust components 48, 48' in an overlapping relationship with respect to adjacent segments of the sleeve ring 46 and cylinder 38, an axially shortened and beneficially compact assembly is provided.

We claim:

1. An oil film bearing for a rolling mill roll having a tapered neck leading to a reduced diameter end section, said bearing comprising:
   - an internally tapered sleeve received in a seated position on said tapered neck, said sleeve being journaled for rotation in a bushing fixed within a chock assembly;
   - a tubular piston received on and fixed relative to said end section;
   - a cylinder internally subdivided by said piston into first and second chambers;
   - a sleeve ring abutting an end of said sleeve;
   - a circular thrust component interposed between and arranged to overlap adjacent segments of said sleeve ring and said cylinder and
   - means for alternatively pressurizing one or the other of said first and second chambers, whereupon pressurization of said first chamber will cause said cylinder to axially advance and act via said thrust component and said sleeve ring to urge said sleeve into its seated position, and pressurization of said second chamber will cause said cylinder to axially retract and act via said chock assembly and said bushing to withdraw said sleeve from its seated position.

2. The oil film bearing of claim 1 wherein said circular thrust component is a roller thrust bearing.

3. The oil film bearing of claim 2 wherein said roller thrust bearing has an inner race captured between said sleeve ring and said cylinder, and outer races captured between confronting elements of said chock assembly.

4. The oil film bearing of claim 1 wherein said circular thrust component comprises a cylindrical ring captured between said sleeve ring and said cylinder.

5. The oil film bearing of claim 4 further comprising flanges projecting radially from said cylindrical ring and spanning a gap between said cylindrical ring and an interior cylindrical surface of said chock assembly.

6. The oil film bearing of claim 1 wherein said sleeve ring and said cylinder have axially adjacent cylindrical noses overlapped by said thrust component.

* * * * *